US012777103B2

(12) United States Patent
Gazda et al.

(10) Patent No.: US 12,777,103 B2
(45) Date of Patent: Oct. 27, 2026

(54) METHODS FOR EXPORTING SERVICES GENERATED AT CMEC TO EMEC APPLICATIONS

(71) Applicant: InterDigital Patent Holdings, Inc., Wilmington, DE (US)

(72) Inventors: Robert Gazda, Spring City, PA (US); Antonio de la Oliva, Madrid (ES); Carlos Jesus Bernardos, Madrid (ES); Debashish Purkayastha, Collegeville, PA (US); Shalini Choudhury, Highland Park, NJ (US); Alain Mourad, Ascot (GB)

(73) Assignee: InterDigital Patent Holdings, Inc., Wilmington, DE (US)

( * ) Notice: Subject to any disclaimer, the term of this patent is extended or adjusted under 35 U.S.C. 154(b) by 185 days.

(21) Appl. No.: 18/568,063

(22) PCT Filed: Jun. 7, 2022

(86) PCT No.: PCT/US2022/032507

§ 371 (c)(1),
(2) Date: Dec. 7, 2023

(87) PCT Pub. No.: WO2022/261098

PCT Pub. Date: Dec. 15, 2022

(65) Prior Publication Data

US 2025/0274527 A1 Aug. 28, 2025

Related U.S. Application Data

(60) Provisional application No. 63/197,627, filed on Jun. 7, 2021.

(51) Int. Cl.
*G06F 15/16* (2006.01)
*H04L 67/1001* (2022.01)
(Continued)

(52) U.S. Cl.
CPC ........ *H04L 67/561* (2022.05); *H04L 67/1001* (2022.05); *H04L 67/289* (2013.01)

(58) Field of Classification Search
CPC .. H04L 67/561; H04L 67/1001; H04L 67/289
(Continued)

(56) References Cited

U.S. PATENT DOCUMENTS

2015/0043558 A1* 2/2015 Choi ................ H04W 74/0808 370/338
2021/0211510 A1* 7/2021 Trossen .................. H04L 67/63
(Continued)

FOREIGN PATENT DOCUMENTS

EP 3 703 337 A1 9/2020

OTHER PUBLICATIONS

Camarillo et al., "Integration of Resource Management and Session Initiation Protocol (SIP)", Internet Engineering Task Force (IETF); Standard, Internet Society (ISOC), Oct. 2002, 30 pages.
(Continued)

*Primary Examiner* — Alan S Chou
(74) *Attorney, Agent, or Firm* — Condo Roccia Koptiw LLP

(57) ABSTRACT

A device may be provided. The device may comprise a processor, it may be determined that a first remote service proxy application (RSPA) that may be associated with the device. A first message may be received from a multi-access edge computing (MEC) node that may be associated with a second remote service proxy application (RSPA). The first message may indicate a transport protocol. A second message may be received from the MEC node using the transport protocol. The second message may indicate a service associated with the second RSPA. A third message may be sent to an MEC platform to register the service associated
(Continued)

with the second RSPA as a local service that may be associated with the first RSPA.

20 Claims, 11 Drawing Sheets

(51) Int. Cl.
*H04L 67/289* (2022.01)
*H04L 67/561* (2022.01)

(58) Field of Classification Search
USPC .......................................................... 709/203
See application file for complete search history.

(56) References Cited

U.S. PATENT DOCUMENTS

| | | | | |
|---|---|---|---|---|
| 2022/0225448 | A1* | 7/2022 | Li | H04W 8/005 |
| 2023/0037031 | A1* | 2/2023 | Wang | H04W 8/08 |
| 2024/0023013 | A1* | 1/2024 | Xiang | H04W 48/18 |
| 2024/0129723 | A1* | 4/2024 | Kunz | H04W 12/041 |
| 2024/0236912 | A1* | 7/2024 | Velev | H04W 60/04 |
| 2024/0259772 | A1* | 8/2024 | Purkayastha | H04L 67/51 |

OTHER PUBLICATIONS

European Telecommunication Standards Institute (ETSI), GR MEC 035 V3.0.1, "Multi-Access Edge Computing (MEC), Study on Inter-MEC Systems and MEC-Cloud Systems Coordination", May 2021, 53 pages.
European Telecommunications Standards Institute (ETSI), GS MEC 003 V2.1.1, "Multi-access Edge Computing (MEC), Framework and Reference Architecture ", Jan. 2019, pp. 1-21.
European Telecommunications Standards Institute (ETSI), GS MEC 013 V2.1.1, "Multi-access Edge Computing (MEC), Location API", Sep. 2019, pp. 1-39.
Kekki et al., "MEC in 5G Networks", ETSI White Paper No. 28, First edition, Jun. 2018, pp. 1-28.
Lin et al., "PhysarumSM: P2P Service Discovery and Allocation in Dynamic Edge Networks", 2021 IFIP/IEEE International Symposium on Integrated Network Management (IM), May 2021, 9 pages.
GR MEC 036 V3.0.0, "European Telecommunications Standards Institute (ETSI)", Multi-access Edge Computing (MEC); Study on MEC in resource constrained terminals, fixed or mobile, Oct. 2020, 17 pages.

* cited by examiner

METHODS FOR EXPORTING SERVICES GENERATED AT CMEC TO EMEC APPLICATIONS

CROSS-REFERENCE TO RELATED APPLICATIONS

The application is the National Stage Entry under 35 U.S.C. § 371 of Patent Cooperation Treaty Application No. PCT/US2022/032507, filed Jun. 7, 2022, which claims the benefit of U.S. Provisional Application 63/197,627, filed Jun. 7, 2021, the contents of which are incorporated by reference in their entirety herein.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Systems and methods are described herein for exporting services generated at a constrained multi-access edge computing (cMEC) applications to edge MEC (eMEC) applications. Services generated at an MEC platform at a cMEC may be exposed, for example, to be consumed by eMEC applications. Mp1 interfaces may allow the use of remote transports. A cMEC may provide services to different WTRUs, which may be connected to different eMECs. The applications may be aware of the consumption and generation of the services, which may be done through an Mp1 interface. A communication between a cMEC and eMEC may be available. The cMEC and eMEC may negotiate a transport protocol that may be used to expose the cMEC-generated service, for example, via a remote service proxy application (RSPA). An application in the cMEC may generate a service, which may be exposed to the eMEC. The RSPA instance in the cMEC may register with a MEC platform at the cMEC, for example, to receive notifications of services that register with the MEC platform. If the service is notified to the RSPA in the cMEC, it may send a message to the RSPA in the eMEC and may register the service with the RSPA in the eMEC. The interface used between the RSPA in the cMEC and the RSPA in the eMEC may be Mpp-rspa. The RSPA in the eMEC may register the remote service locally at the MEC platform of eMEC, for example, if the RSPA in the eMEC receives the registration of the service.

A device may be provided. The device may comprise a processor. It may be determined that a first remote service proxy application (RSPA) that may be associated with the device. A first message may be received from a multi-access edge computing (MEC) node that may be associated with a second remote service proxy application (RSPA). The first message may indicate a transport protocol. A second message may be received from the MEC node using the transport protocol. The second message may indicate a service associated with the second RSPA. A third message may be sent to an MEC platform to register the service associated with the second RSPA as a local service that may be associated with the first RSPA.

The device may be a wireless transmit/receive unit (WTRU). The first WTRU may be a multi-access edge computing (MEC) device, a constrained MEC, a server, and/or the like. A first WTRU may include a processor. The first WTRU may be configured to determine that an application provides a service. The first WTRU may be configured to determine that the service (e.g., provided by the application) can be used remotely. The first WTRU may send a first message, for example, to a second WTRU (e.g., a multi-access edge computing (MEC) device, a constrained MEC device, an MEC device associated with a Telco Edge node, etc.). The first WTRU may send the first message, for example, based on the determination that the application provides a service and that the service can be used remotely. The first message may indicate an identification of the service. The first message may indicate a set of transport parameters. The first WTRU may be configured to receive a second message from the second WTRU. The second message may indicate that the second WTRU has created a resource associated with the service. The second message may indicate that the service has been registered with the second WTRU. The first WTRU may be configured to send a third message to the second WTRU using a transport parameter (e.g., at least one transport parameter from the set of transport parameters). The third message may include data associated with the service that has been registered. The first WTRU may be configured to send a negotiation request message, for example, to the second WTRU. The negotiation request message may indicate a transport data type. The first WTRU may be configured to receive a negotiation response message, for example, from the second WTRU. The negotiation response message may indicate the at least one transport parameter. The first WTRU may be configured to send a service update message, for example, to the second WTRU. The service update message may indicate that there has been a modification of data associated with the service. The first WTRU may be configured to send a deregistration request message, for example, to the second WTRU. The deregistration request message may indicate a request (e.g., for the second WTRU) to deregister the service. The first WTRU may be configured to receive a deregistration response message. The deregistration response message may indicate that the service has been deregistered. The messages sent by the first WTRU may be sent via an interface, for example, such as Mpp-rspa.

A first WTRU may include a processor. The first WTRU may be an MEC device, a constrained MEC device, an MEC device associated with a Telco Edge node, and/or the like. The first WTRU may be configured to receive a first message. The first message may indicate an identification of a service. The first message may indicate a set of transport parameters. The first WTRU may be configured to send a second message, for example, to a second WTRU (e.g., a MEC device, a constrained MEC, a server, and/or the like). The first WTRU may be configured to send a second message (e.g., to a second WTRU), for example, when (e.g., if) the service has been registered. The first WTRU may be configured to send a second message (e.g., to a second WTRU), for example, when (e.g., if) a resource associated with the service has been created. The first WTRU may be configured to send a second message (e.g., to a second WTRU), for example, when (e.g., if) the service has been registered and a resource associated with the service has been created. The first WTRU may be configured to receive a third message, for example, using at least one transport parameter (e.g., from the set of transport parameters). The third message may include data associated with the service that has been registered. The first WTRU may be configured to receive a negotiation request message (e.g., from the second WTRU). The negotiation request message may indicate a transport data type. The first WTRU may be configured to send a negotiation response message (e.g., to the second WTRU). The negotiation response message may indicate the at least one transport parameter from the set of transport parameters. The at least one transport parameter may be selected, for example, from the set of the transport parameters. The at least one transport parameter may be selected from the set of the transport parameters, for example, based on the indicated transport data type. The first WTRU may be configured to receive a service update message. The service update message may indicate that there has been a modification of data associated with the service. The first WTRU may be configured to receive a deregistration request message. The deregistration request message may indicate a request for the first WTRU to deregister the service. The first WTRU may be configured to deregister the service. The first WTRU may be configured to send a deregistration response message (e.g., to the second WTRU.) The first WTRU may be configured to send a deregistration response message to the second WTRU, for example, when (e.g., if) a resource associated with the service has been released. The deregistration response message may indicate that the service has been deregistered. The messages sent by the first WTRU may be sent via an interface, for example, such as Mpp-rspa.

DETAILED DESCRIPTION

Figure 1A:
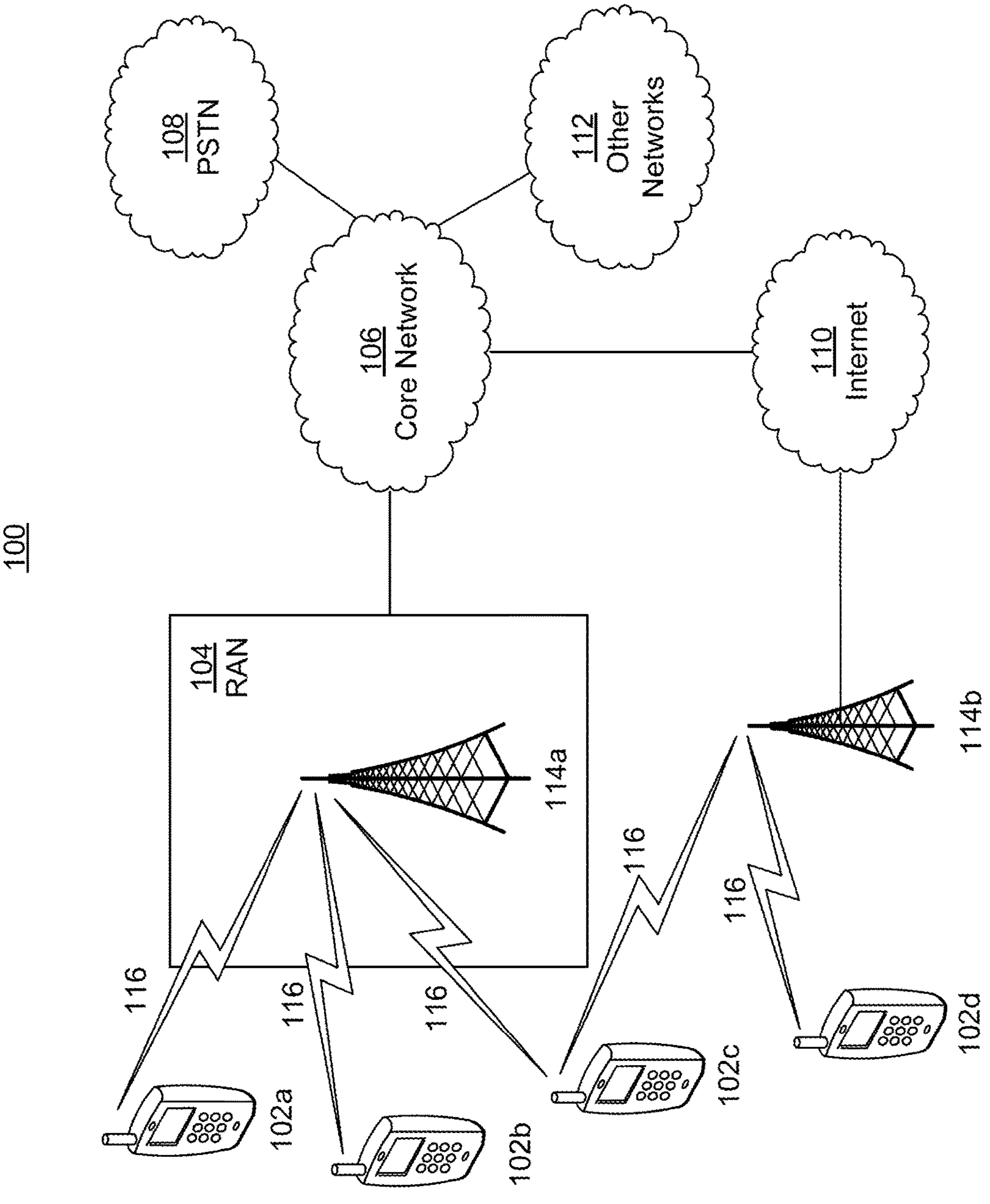
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c*, and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B (eNB), a Home Node B, a Home eNode B, a gNode B (gNB), a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
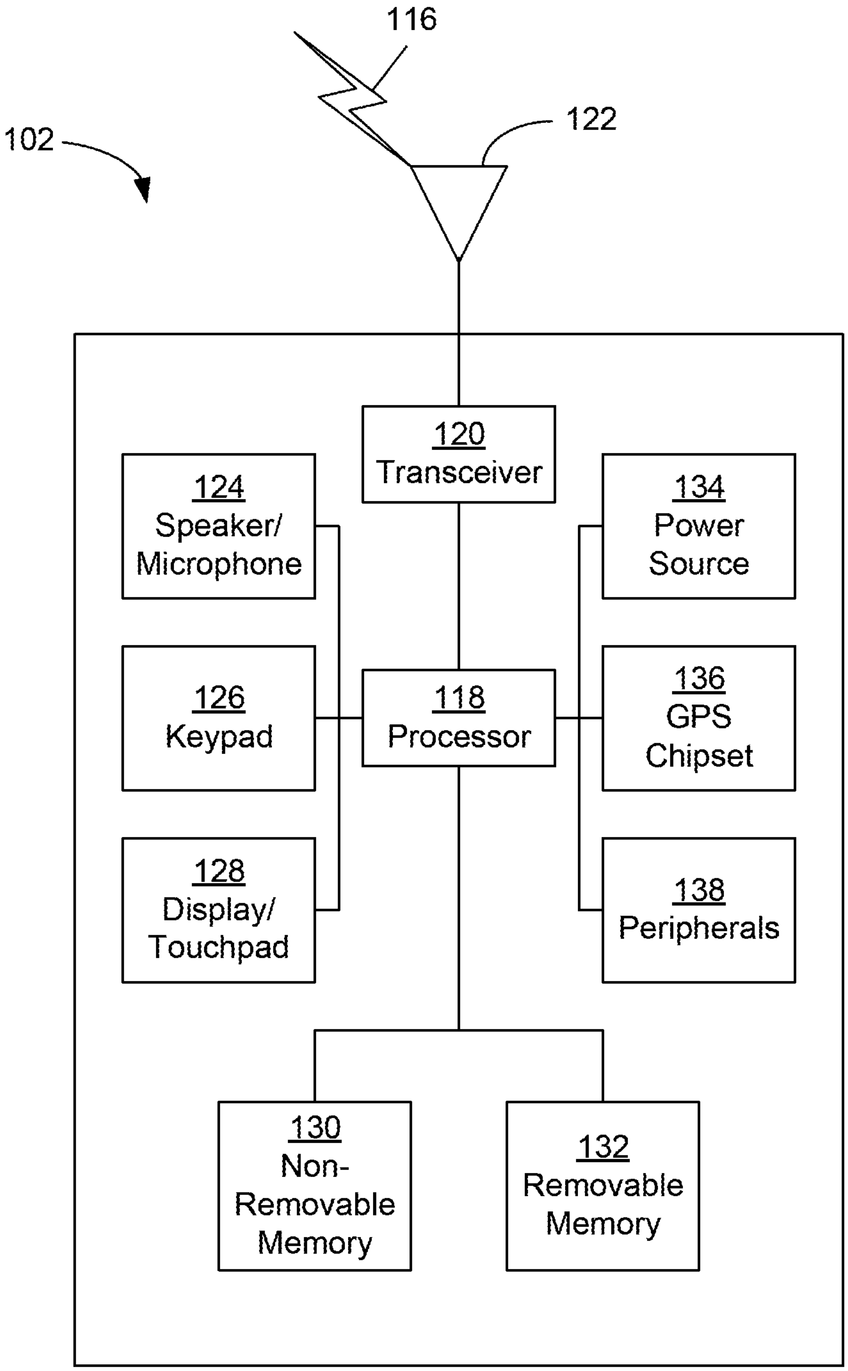
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
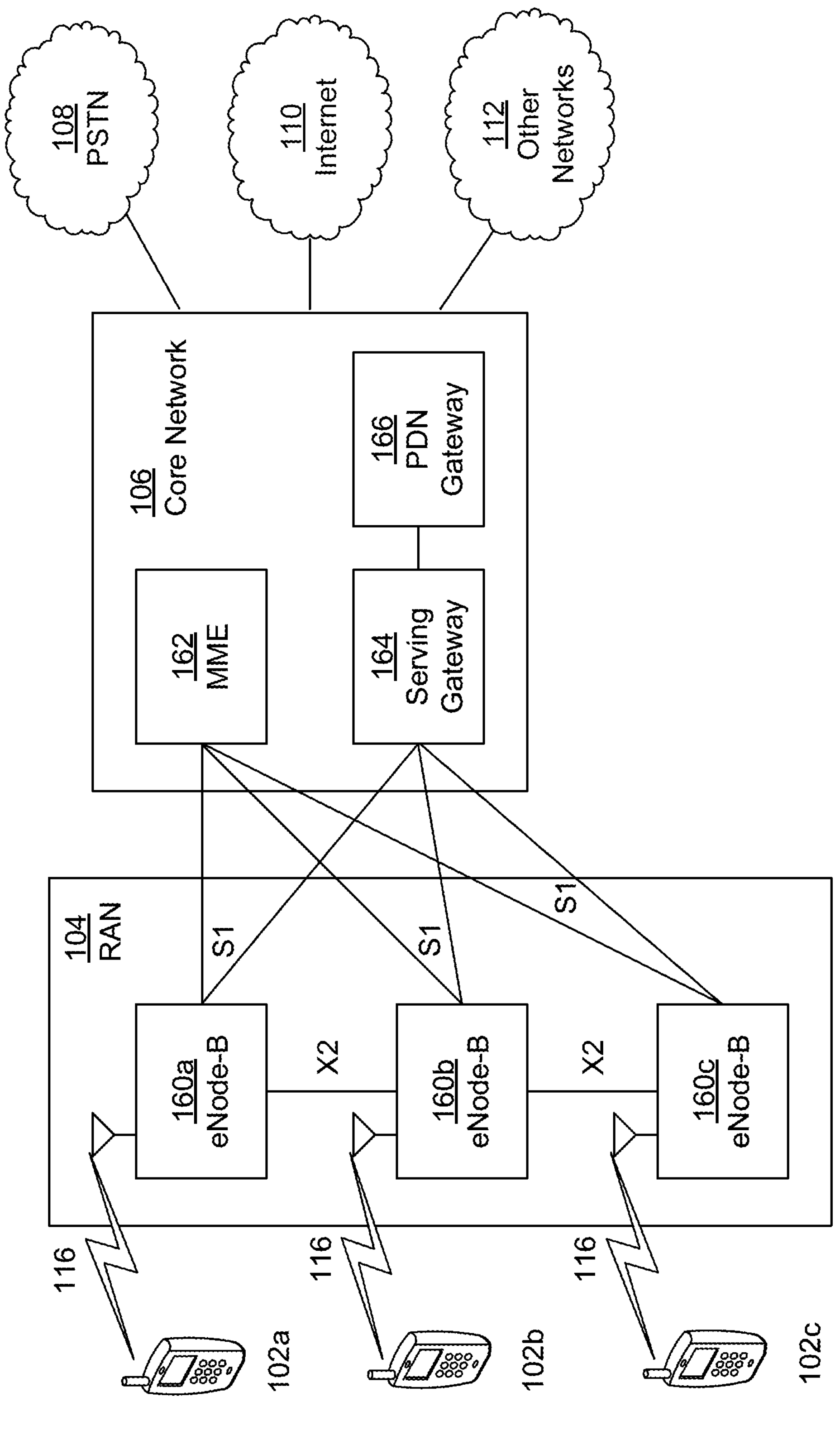
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an “ad-hoc” mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHZ, 2 MHZ, 4 MHZ, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
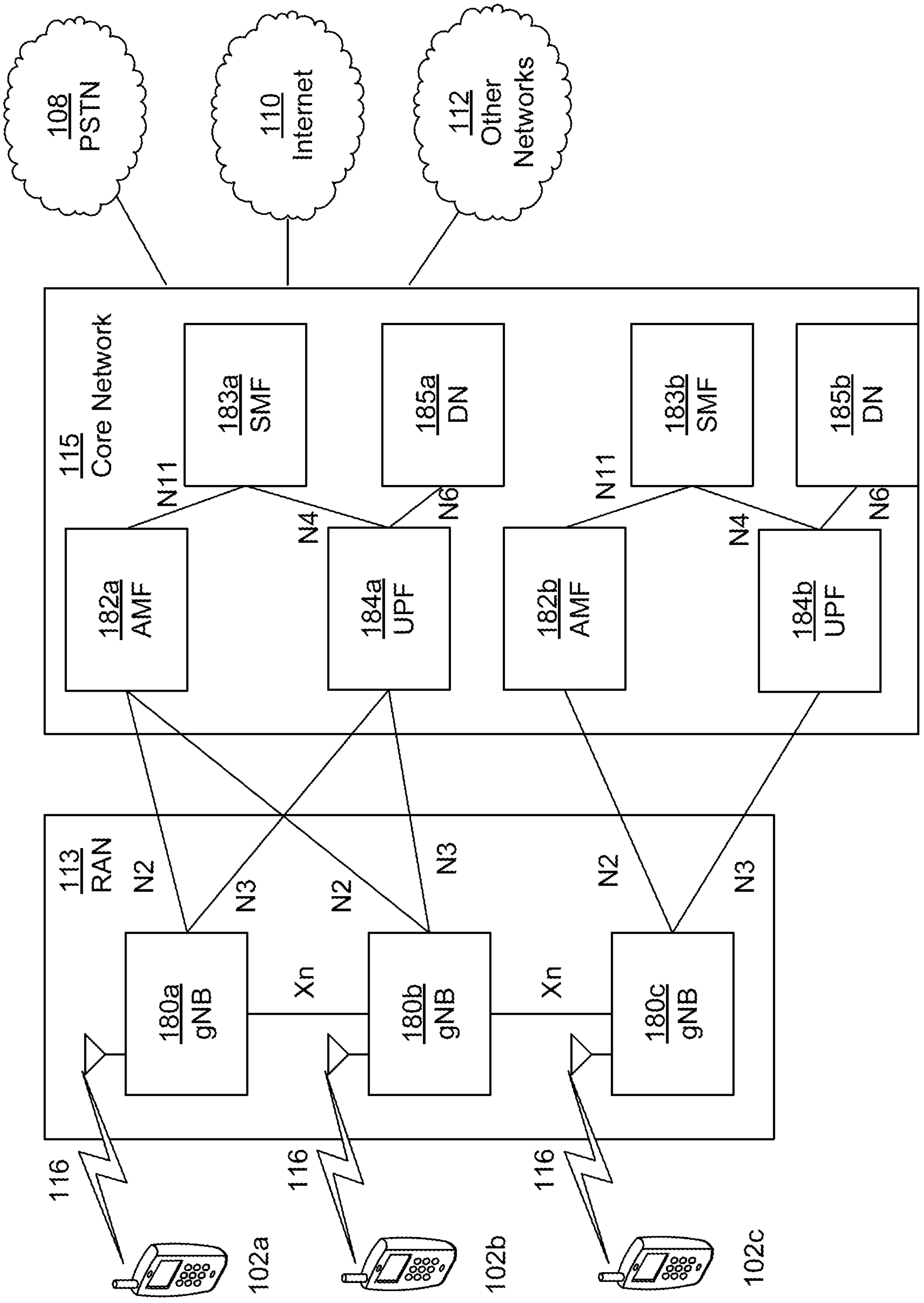
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems and methods are described herein for exporting services generated at a constrained multi-access edge computing (cMEC) applications to edge MEC (eMEC) applications. Services generated at an MEC platform at a cMEC may be exposed, for example, to be consumed by eMEC applications. Interfaces (e.g., Mp1 interfaces) may enable (e.g., allow) the use of remote transports. A cMEC may provide services to different WTRUs, which may be connected to different eMECs. The applications may be aware of the consumption and generation of the services, which may be done through an Mp1 interface. A communication between a cMEC and eMEC may be available. The cMEC and eMEC may negotiate a transport protocol (e.g., transport parameters) that may be used to expose the cMEC-generated service, for example, via a remote service proxy application (RSPA). An application in the cMEC may generate a service, which may be exposed to the eMEC. The RSPA instance in the cMEC may register with a MEC platform at the cMEC, for example, to receive notifications of services that register with the MEC platform. If the service is notified to the RSPA in the cMEC, it may send a message to the RSPA in the eMEC and may register the service with the RSPA in the eMEC. The interface used between the RSPA in the cMEC and the RSPA in the eMEC may, for example, be Mpp-rspa. The RSPA in the eMEC may register the remote service locally at the MEC platform of eMEC, for example, if the RSPA in the eMEC receives the registration of the service.

A device may be provided. The device may comprise a processor. It may be determined that a first remote service proxy application (RSPA) may be associated with the device. A first message may be received from a multi-access edge computing (MEC) node that may be associated with a second remote service proxy application (RSPA). The first message may indicate a transport protocol (e.g., transport parameters). A second message may be received from the MEC node using the transport protocol. The second message may indicate a service associated with the second RSPA. A third message may be sent to an MEC platform to register the service associated with the second RSPA as a local service that may be associated with the first RSPA.

The device may be a wireless transmit/receive unit (WTRU). The first WTRU may be a multi-access edge computing (MEC) device, a constrained MEC, a server, and/or the like. A first WTRU may include a processor. The first WTRU may be configured to determine that an application provides a service. The first WTRU may be configured to determine that the service (e.g., provided by the application) can be used remotely. The first WTRU may send a first message, for example, to a second WTRU (e.g., a multi-access edge computing (MEC) device, a constrained MEC device, an MEC device associated with a Telco Edge node, etc.). The first WTRU may send the first message, for example, based on the determination that the application provides a service and that the service can be used remotely. The first message may indicate an identification of the service. The first message may indicate a set of transport parameters. The first WTRU may be configured to receive a second message from the second WTRU. The second message may indicate that the second WTRU has created a resource associated with the service. The second message may indicate that the service has been registered with the second WTRU. The first WTRU may be configured to send a third message to the second WTRU using a transport parameter (e.g., at least one transport parameter from the set of transport parameters). The third message may include data associated with the service that has been registered. The first WTRU may be configured to send a negotiation request message, for example, to the second WTRU. The negotiation request message may indicate a transport data type. The first WTRU may be configured to receive a negotiation response message, for example, from the second WTRU. The negotiation response message may indicate the at least one transport parameter. The first WTRU may be configured to send a service update message, for example, to the second WTRU. The service update message may indicate that there has been a modification of data associated with the service. The first WTRU may be configured to send a deregistration request message, for example, to the second WTRU. The deregistration request message may indicate a request (e.g., for the second WTRU) to deregister the service. The first WTRU may be configured to receive a deregistration response message. The deregistration response message may indicate that the service has been deregistered. The messages sent by the first WTRU may be sent via an interface, for example, such as Mpp-rspa.

A first WTRU may include a processor. The first WTRU may be an MEC device, a constrained MEC device, an MEC device associated with a Telco Edge node, and/or the like. The first WTRU may be configured to receive a first message. The first message may indicate an identification of a service. The first message may indicate a set of transport parameters. The first WTRU may be configured to send a second message, for example, to a second WTRU (e.g., a MEC device, a constrained MEC, a server, and/or the like). The first WTRU may be configured to send a second message (e.g., to a second WTRU), for example, when (e.g., if) the service has been registered. The first WTRU may be configured to send a second message (e.g., to a second WTRU), for example, when (e.g., if) a resource associated with the service has been created. The first WTRU may be configured to send a second message (e.g., to a second WTRU), for example, when (e.g., if) the service has been registered and a resource associated with the service has been created. The first WTRU may be configured to receive a third message, for example, using at least one transport parameter (e.g., from the set of transport parameters). The third message may include data associated with the service that has been registered. The first WTRU may be configured to receive a negotiation request message (e.g., from the second WTRU). The negotiation request message may indicate a transport data type. The first WTRU may be configured to send a negotiation response message (e.g., to the second WTRU). The negotiation response message may indicate the at least one transport parameter from the set of transport parameters. The at least one transport parameter may be selected, for example, from the set of the transport parameters. The at least one transport parameter may be selected from the set of the transport parameters, for example, based on the indicated transport data type. The first WTRU may be configured to receive a service update message. The service update message may indicate that there has been a modification of data associated with the service. The first WTRU may be configured to receive a deregistration request message. The deregistration request message may indicate a request for the first WTRU to deregister the service. The first WTRU may be configured to deregister the service. The first WTRU may be configured to send a deregistration response message (e.g., to the second WTRU.) The first WTRU may be configured to send a deregistration response message to the second WTRU, for example, when (e.g., if) a resource associated with the service has been released. The deregistration response message may indicate that the service has been deregistered. The messages sent by the first WTRU may be sent via an interface, for example, such as Mpp-rspa.

Multi-access edge computing may be performed. Multi-access edge computing (MEC) (e.g., mobile edge computing) capabilities deployed in the edge of the mobile network may enable (e.g., facilitate) provisioning (e.g., the efficient and dynamic provisioning of) services to mobile users. An open environment may be specified, for example, for integrating MEC capabilities with service providers' networks and/or including applications from 3rd parties (e.g., as show in FIG. 2). These distributed computing capabilities may make available IT infrastructure as in a cloud environment, for example, for the deployment of functions in mobile access networks.

In examples described herein, a WTRU may be or may comprise a cMEC, an eMEC, an RSPA, a MEC node, and/or the like. For example, a WTRU may be a cMEC. As another example, a WTRU may be an eMEC.

Figure 2:
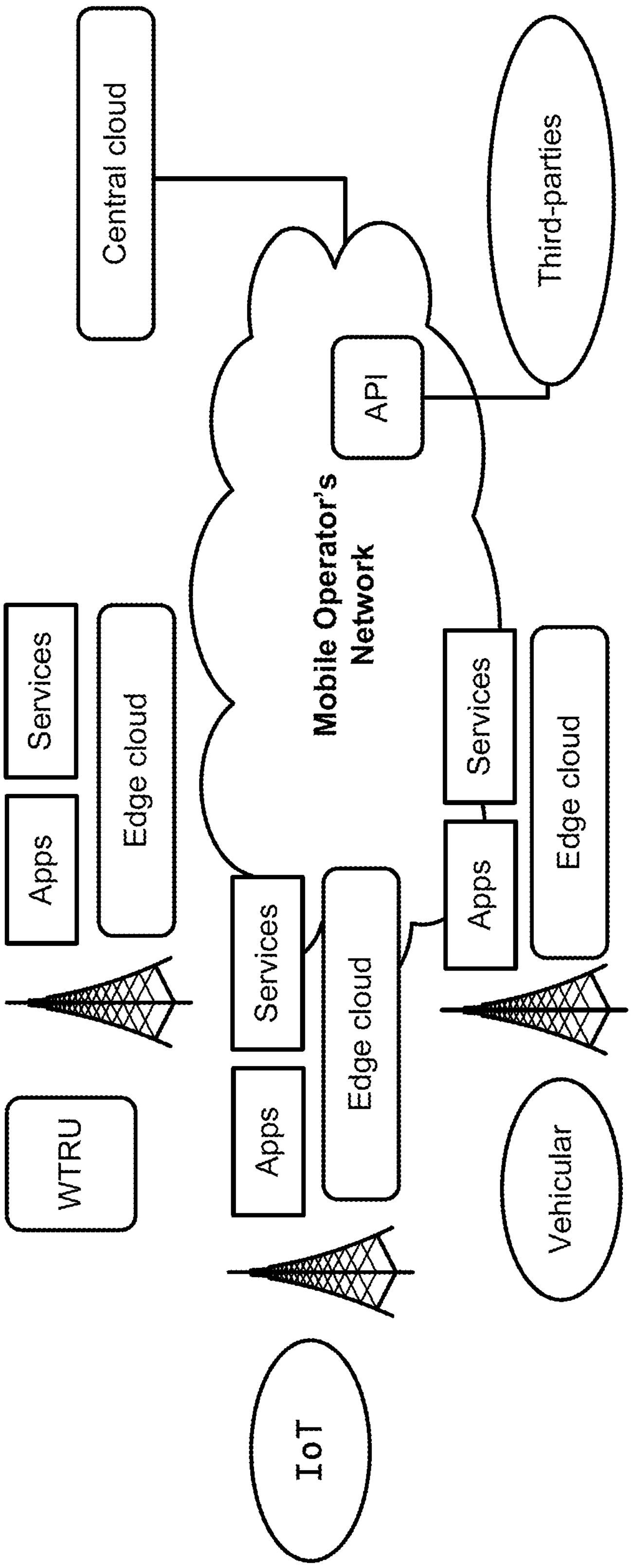
FIG. 2 illustrates an example multi-access edge computing (MEC) architecture.
Figure 3:
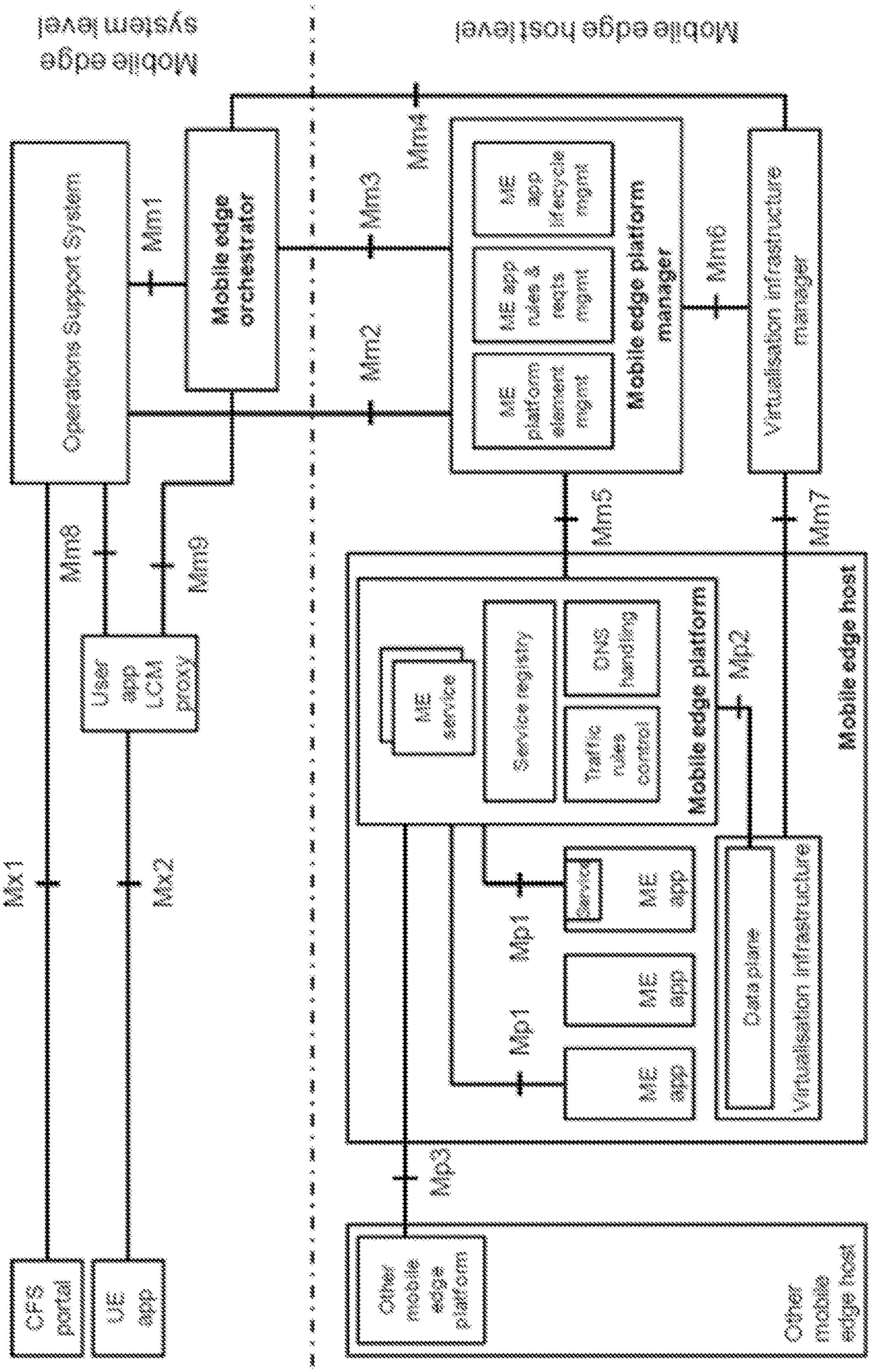
FIG. 3 illustrates an example MEC architecture.

FIG. 2 illustrates an example MEC architecture. For example, FIG. 2 may illustrate an example MEC architecture that may be used. FIG. 3 illustrates another example MEC architecture. The MEC reference architecture may have functional elements that may comprise the mobile edge system and the reference points between them as shown in FIG. 3.

There may be one or more groups of reference points (e.g., three groups of reference points) that may be defined between the system entities. The one or more groups of reference points may include reference points regarding the mobile edge platform functionality (Mp), management reference points (Mm), and/or reference points connecting to external entities (Mx).

The mobile edge system may include mobile edge hosts and the mobile edge management to run mobile edge applications within an operator network or a subset of an operator network. The mobile edge host may be an entity that includes a mobile edge platform and a virtualization infrastructure, for example, which may provide compute, storage, and network resources (e.g., for the purpose of running mobile edge applications). The mobile edge platform may be the collection of functionalities (e.g., essential functionalities) for running mobile edge applications, for example, on a particular virtualization infrastructure and for enabling them to provide and consume mobile edge services.

Mobile edge applications may be instantiated on the virtualization infrastructure of the mobile edge host, for example, based on configuration requests validated by the mobile edge management. The mobile edge management may comprise the mobile edge system level management and the mobile edge host level management. The mobile edge system level management may include the mobile edge orchestrator as a component (e.g., its core component), which may have an overview of the complete mobile edge system. The mobile edge host level management may comprise the mobile edge platform manager and the virtualization infrastructure manager, and may handle the management of the mobile edge specific functionality (e.g., of a particular mobile edge host) and the applications running on it.

MEC in resource constrained terminals (e.g., fixed or mobile) may be provided. Terminal units, mobile hosts and personal devices may be used to support cloud computing at the edge.

MEC may be deployed, for example, in a radio access network (RAN) such as 5G. MEC may be deployed and integrated in the RAN architecture (e.g., such as 5G architecture). For example, MEC may be deployed and integrated in an (e.g., 5G) architecture where MEC may benefit from the enablers (e.g., edge computing enablers) of the (e.g., 5G) system specification, and the ecosystem may benefit from the MEC system and its APIs, for example, as a set of complementary capabilities to enable applications and services environments in the very edge of mobile networks.

Figure 4:
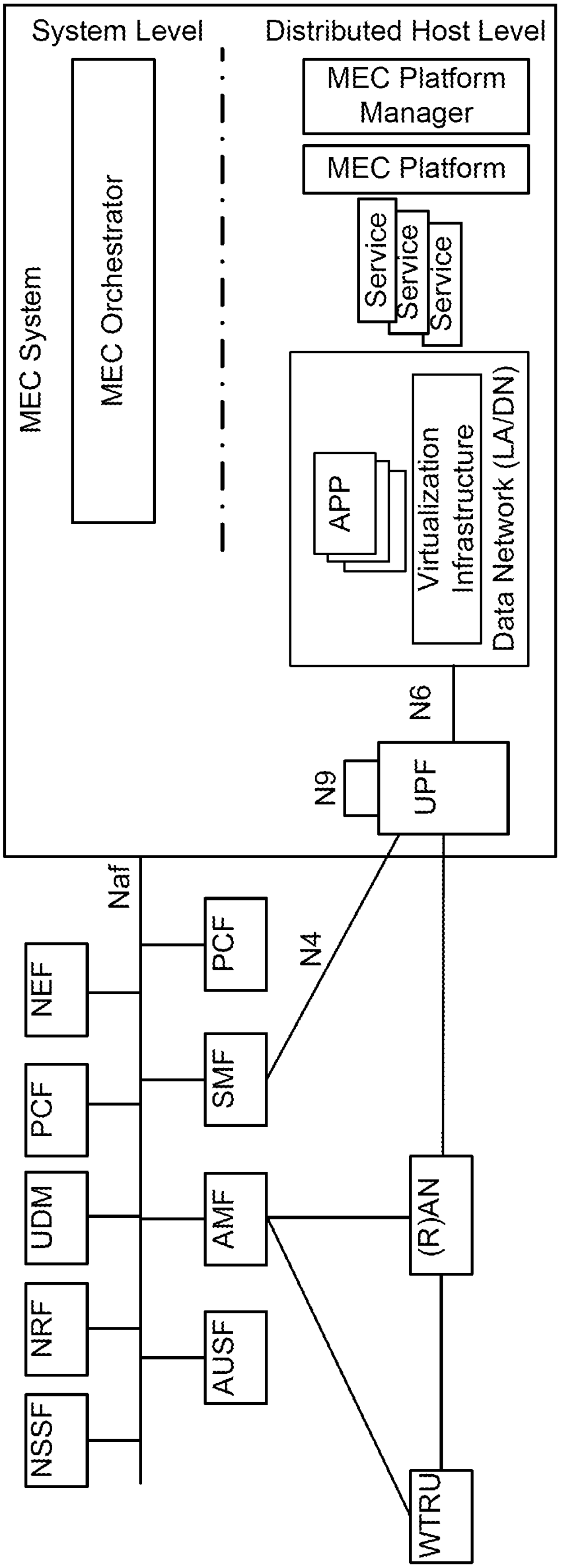
FIG. 4 illustrates an example MEC deployment in an integrated manner with a radio access network, such as 5G.

MEC may map onto application functions (AF) that may use the services and information offered by other network functions, for example, based on the configured policies. A number of functionalities (e.g., enabling functionalities) may be defined, for example, to provide flexible support for different deployments of MEC and to support MEC (e.g., in case of user mobility events). FIG. 4 illustrates an example MEC deployment in an integrated manner with an RAN, such as 5G. As shown in FIG. 4 (e.g., in the MEC system on the right-hand side) the MEC orchestrator may be a MEC system level functional entity, for example, that (e.g., acting as an AF) may interact with the network exposure function (NEF) or may interact directly with the target NFs (e.g., 5G NFs). On the MEC host level, the MEC platform may interact with the (e.g., 5G) NFs (e.g., in the role of an AF). The MEC host (e.g., the host level functional entities) may be deployed, for example, in a data network in the (e.g., 5G) system. The NEF (e.g., which may be a core network function) may be a system level entity, for example, deployed centrally together with similar NFs. An instance of NEF may be deployed in the edge, for example, to allow low latency, high throughput service access from an MEC host. MEC may be deployed on the N6 reference point, (e.g., in a data network external to the 5G system).

Different MEC deployment scenarios may be performed. MEC hosts may be deployed, for example, in the edge or central data network. The user plane function (UPF) may steer the user plane traffic, for example, towards the targeted MEC applications in the data network. Physical deployment of MEC hosts may include any of the following: MEC and the local UPF collocated with the base station, MEC collocated with a transmission node (e.g., a local UPF), MEC and the local UPF collocated with a network aggregation point, MEC collocated with the core network functions (e.g., in the same data center), and/or MEC in constrained devices.

MEC technologies may be applied in terminal units, mobile hosts, and/or personal devices, for example, that can be used to support cloud computing at the edge. These devices may have one or more of the following aspects: limited computational capacity available (e.g., to run MEC applications and its implication in the lifecycle of the virtual instances); volatility of the computing resources, for example, including the mobility of the terminals hosting the MEC infrastructure and the problems regarding the reliability of the connectivity between the constrained device and the infrastructure; and/or security and authorization specific functions and its impact on the privacy of user data.

Figure 5:
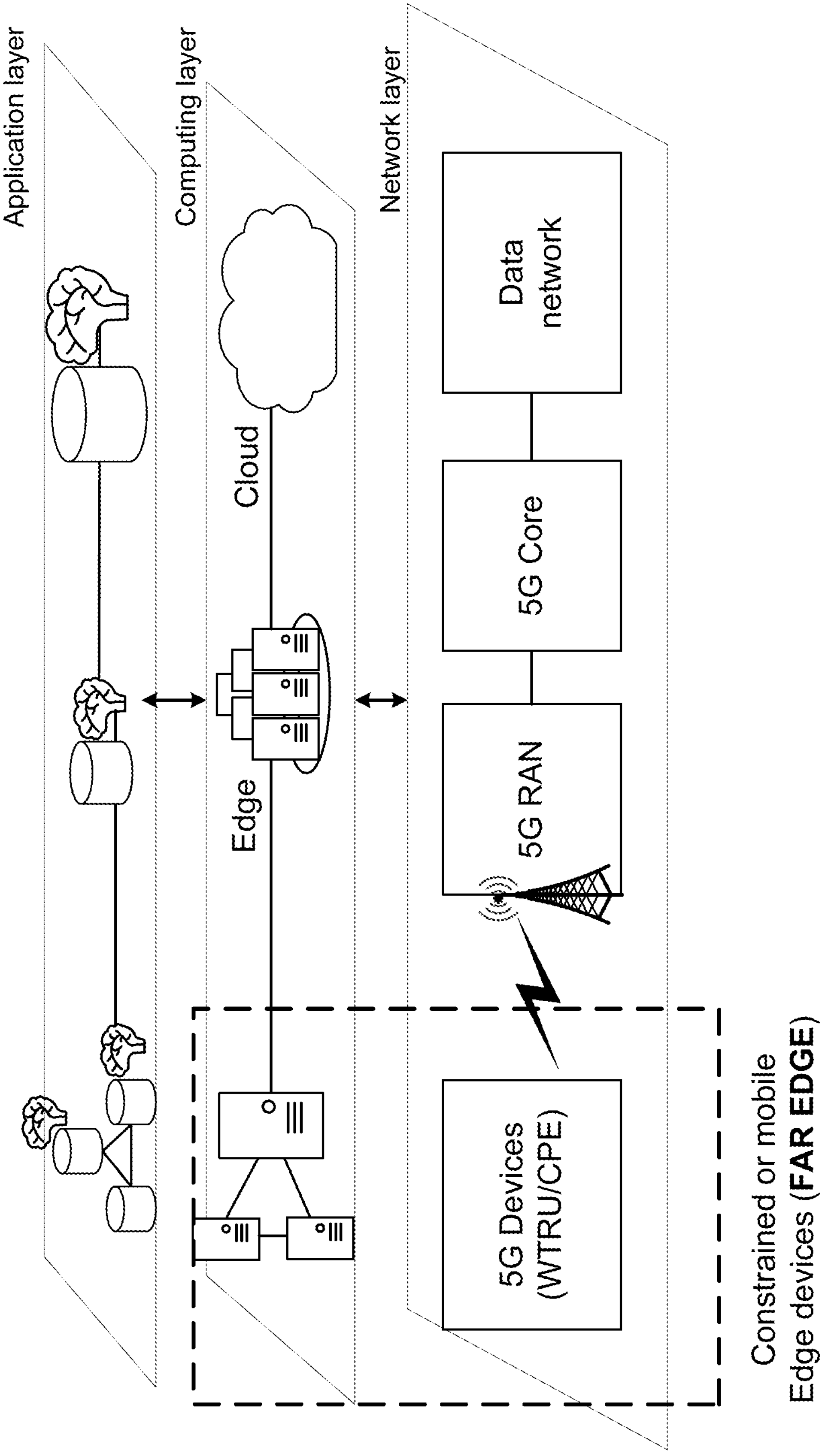
FIG. 5 illustrates example use cases for MEC in one or more constrained devices.

FIG. 5 illustrates example use cases for MEC in constrained devices. As shown in FIG. 5, the framework may include one or more logical layers. For example, framework may include one of more of the following (e.g., three layers): the network layer, computing layer, and application layer.

As shown in FIG. 5 the network layer may use an end-to-end (e.g., 5G) network. The computing layer may be composed of different computing tiers, for example, the central cloud, the edge cloud (e.g., Telco Edge) connected to network edge, and far edge capabilities associated with the constrained devices (e.g., WTRUs or CPEs). Far edge capabilities may be embedded in the constrained terminal devices or provisioned (e.g., dynamically provisioned). Constrained devices may be battery-powered, mobile, volatile, with limited computing and connectivity, for example, as compared to the traditional edge clouds. The constrained devices may collaborate and exchange information among themselves. The application layer (e.g., which may provide functionalities such as telemetry, training and inference) may be distributed across different computing tiers, for example, including far edge constrained devices. Applications and functions may be hosted, for example, (e.g., anywhere) in the computing stratum (e.g., in cloud, edge or far edge devices).

Use cases may benefit from this technology. The use cases may include the following: use of constrained devices for federated learning (FL), use of constrained devices for a smart factory, and/or use of constrained devices for multi-player AR/VR multimodal mobile gaming.

Constrained devices may be used for FL. FL may be a distributed learning technique, for example, where privacy sensitive training data may be generated and processed (e.g., processed unevenly) across learning agents instead of being transported and processed in a centralized edge cloud or distant cloud. Federated learning may allow an agent (e.g., each agent deployed on a far edge constrained device) to compute a set of local learning parameters from the available training data, which may be referred to as a local model. Instead of sharing the training data, agents may share their local models with a central entity (e.g., edge cloud), which may perform model averaging and share a global model with the agents (e.g., on the far edge constrained devices). Federated learning may refrain from (e.g., not require) exchanging training data, which may reduce the communication latencies and provide a solution able to work with sensitive data at the end device (e.g., because these data may not be exchanged with other entities).

Constrained devices may be used in a smart factory. The machines and devices in the smart factory may have capabilities for networking, computing, and storage. The computing capability on the local machines and devices in the factory may support distributed data telemetry and intelligent functionalities locally. Numerous cameras and sensors, which may include cameras on wheels (e.g., carried by guided vehicles), may continuously monitor the production line. The cameras and sensors may be capable of data storage and fast data analysis, for example, including extracting and capitalizing on the corresponding knowledge in real-time. Running FL coupled with advancements in deep learning (DL) across multiple participating end devices may enable (e.g., open possibilities for) optimization of manufacturing processes in a smart factory. Smart manufacturing processes may use (e.g., demand) real-time inference of the data collected, for example, to prevent delays, avoid mistakes, and improve efficiency. A distributed localized edge computing solution may be leveraged, for example, to provide factory managers with the ability to quickly parse real-time data, make better informed decisions, and recognize potential defects in production.

Constrained devices may be used for multi-player AR/VR multimodal mobile gaming. Cloud gaming may be possible. Cloud gaming may not achieve the graphic quality of locally computed counterparts in dedicated hardware. With the addition of AR/VR, local computation may overcome the latency limitations of current architectures. This extra local computation may be provided, for example, by a local MEC in a constrained device.

Deployment and interconnection of MEC systems may be enabled in constrained devices. The constrained devices may host applications and, for example, due to their close locality to the user, the constrained devices may provide contextual information (e.g., generated by applications or from the constrained MEC devices) that may be consumed by other applications, for example, located in the device edge or in the Telco Edge.

MEC applications (e.g., located in the Telco Edge) may consume a service generated by a MEC application (e.g., instantiated in a constraint MEC). An application running in a cMEC may be able to expose the services it generates to other applications running in eMEC/cMEC systems. Different WTRUs making use of a cMEC infrastructure may be managed, for example, by different eMECs. The application-generated services may be exposed, for example, to multiple eMECs (e.g., depending on the WTRU to eMEC association). Functionalities may be added to the MEC architecture, for example, to enable a cMEC to expose services to different eMECs. Different cMECs and eMECs may have configuration profiles or capabilities (e.g., diverse configuration profiles or capabilities), and the exposed service may use transport mechanisms for cMEC/eMEC connection pairs (e.g., different transport mechanisms for different cMEC/eMEC connection pairs). Transformation between serialization mechanisms may also be used to accommodate different capabilities. Applications may be unaware of the fact that they are running in a cMEC. The applications may provide services, for example, which can (e.g., only) be consumed locally. Mechanisms may be provided to expose and transport these services between cMEC and eMEC entities, for example, which may be transparent for the applications generating or consuming the service.

The MEC located at the Telco Edge may be referred to as an eMEC. The local MEC in a constrained (e.g., constraint) device may be referred to as cMEC.

Services generated at the MEC platform collocated at a cMEC or generated at applications instantiated at cMECs may be exposed, for example, to be consumed by applications instantiated at the eMEC. An embodiment may include one or more characteristics, such as three characteristics.

In an example, a characteristic may be that an Mp1 interface may allow the use of remote transports, but it may demand or request the application to register to the remote MEC platform. The registration of the service across remote eMEC/cMEC platforms may be handled, for example, which may include a mechanism to register transparently a remote service in a local MEC platform (e.g., as a local service).

In an example, a characteristic may be that a cMEC may provide services to WTRUs (e.g., different WTRUs), which may be connected to different Telcos. The cMEC may maintain an association of cMEC deployed applications and services and their corresponding counterparts, for example, at the eMEC. A cMEC may expose different services to different eMECs through different transports.

In an example, a characteristic may be that the consumption and generation of the service may be performed through Mp1 and the consumption and generation of the service may be transparent to the applications. The applications may be aware of the nature of the service (e.g., the remote nature of the service is informed to the consuming apps), but they may refrain from performing a (e.g., not perform any) special action to interact with the service.

Figure 6:
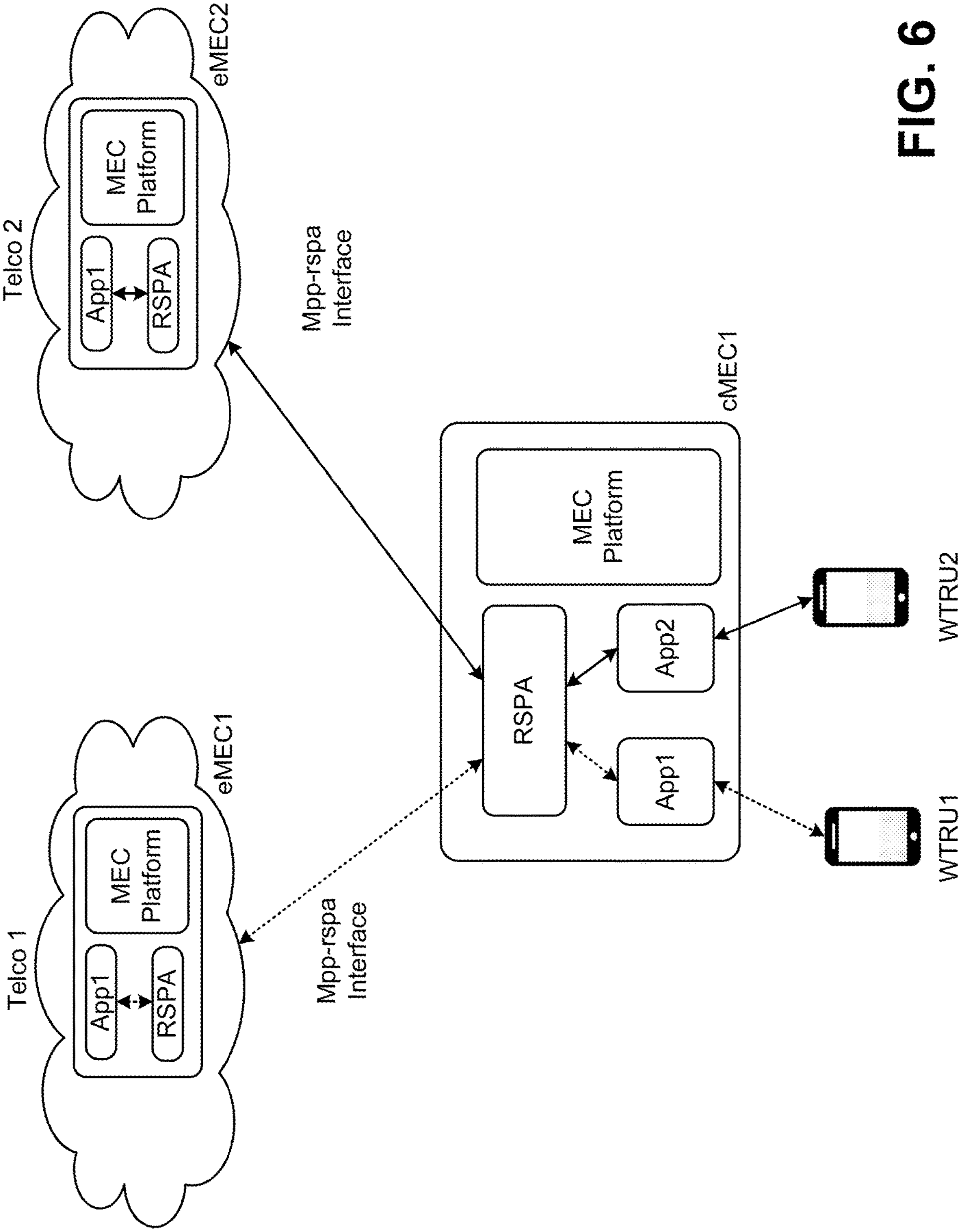
FIG. 6 illustrates an example architecture of a constrained MEC (cMEC) interacting with an edge MEC (eMEC).

FIG. 6 illustrates an example architecture of a constrained MEC (cMEC) interacting with an edge MEC (eMEC). As shown in FIG. 6, two WTRUs (e.g., WTRU1 and WTRU2) may play a collaborative game. The WTRUs may request the deployment of a gaming application, for example, at the eMEC of their respective operator (e.g., with exemplary names: app1@emec1 and app1@emec2). eMEC1 and eMEC2 may correspond respectively to two MEC platforms operated at the network of operator1 and operator2, respectively.

Both WTRUs may discover and interconnect the local cMEC (e.g., cMEC1 as shown in FIG. 6) to their corresponding eMECs (e.g., eMEC1 and eMEC2). The discovery of cMECs and their interconnection to the eMEC may be performed using other mechanisms, for example, such as cMEC to cMEC communication, intermediation through an eMEC, and/or the like.

cMEC1 may implement a local function within its MEC Platform (e.g., where the cMEC may have an Mp1 endpoint without the need to have a fully functional MEC platform), which may communicate with its peer, for example, at the eMEC1 and eMEC2. These functions may oversee registering and exposing services, for example, between the eMEC and cMECs. These functions may be denoted as remote service proxy applications (RSPAs) and may be in charge of keeping track of the remote services (e.g., at the cMEC) and exposing them as local services. This function may be implemented as a separated application (e.g., running on top of a MEC platform) or integrated into the MEC Platform itself. The RSPA may enable applications in cMECs to register services, for example, for being exposed to a remote eMEC/cMEC without the knowledge of the remote ETSI MEC platform they need to connect to. RSPAs may be enabled to expose services across different administrative domains, e.g., an application of WTRU1 belonging to operator 1 may expose services to an application instantiated in a MEC of a different operator, for example, through the RSPA mediation.

cMEC may be discovered by the WTRUs. Communication/registration may be performed between eMECs and cMECs. Discovery and configuration of the communication may be performed between the RSPAs. A secured communication channel between the RSPAs at the eMEC/cMEC and cMEC may be established (e.g., transport layer security (TLS) connection). This connection may be used to register services among the RSPAs, for example, at the peer MEC platforms while the data (e.g., actual data) of the service may use a different connection transport.

As illustrated in FIG. 6, a cMEC may interact with an eMEC. In examples, two cMECs may expose their services mutually.

The interaction between one application instantiated in the cMEC and a peer application instantiated in an eMEC may include the following. Cases where different applications are instantiated in the cMEC and talk to other peer's apps in different eMECs/cMECs belonging to a variety of operators may be possible. Once the above communication is established, the following procedures may enable cMEC apps to expose services, for example, to eMEC and eMEC deployed MEC apps.

If communication between the cMEC and eMEC is available, the RSPA@cmec1 and RSPA@emec1 may negotiate a transport protocol, for example, that may be used to expose the cMEC-generated (e.g., at an application or platform) service. This transport may be used as a general and/or preferred transport. Transport options (e.g., specific transport options) may be negotiated, for example, in a per service basis.

WTRU1 may instantiate a gaming app, for example at cMEC1. This app (e.g., app1@cmec1) may generate services, for example, which may be exposed to its respective eMEC. The app may register its services to the MEC platform at the cMEC1, for example, via the Mp1 interface. The RSPA instance at cMEC1 may register with the MEC Platform@cmec1 to receive notifications of services (e.g., all new services) which register with the platform. If the service is notified to the RSPA@cmec1, the service may contact the RSPA@emec1 and register the service with it. Mpp-rspa may be an interface between RSPAs, for example, that may be located at cMECs or eMECs. Mpp-rspa may serve a similar purpose as Mp3 or Mpp-fed in the ETSI MEC reference architecture. Mpp-rspa may be extended with capabilities for proxying services.

If the RSPA@emec1 receives the registration of the service, it may register the remote service locally, for example, at the MEC platform of eMEC1, as if the service is generated by it. In this way, app1@emec1 may receive a notification of the service being available and the service may be consumed locally.

Figure 7:
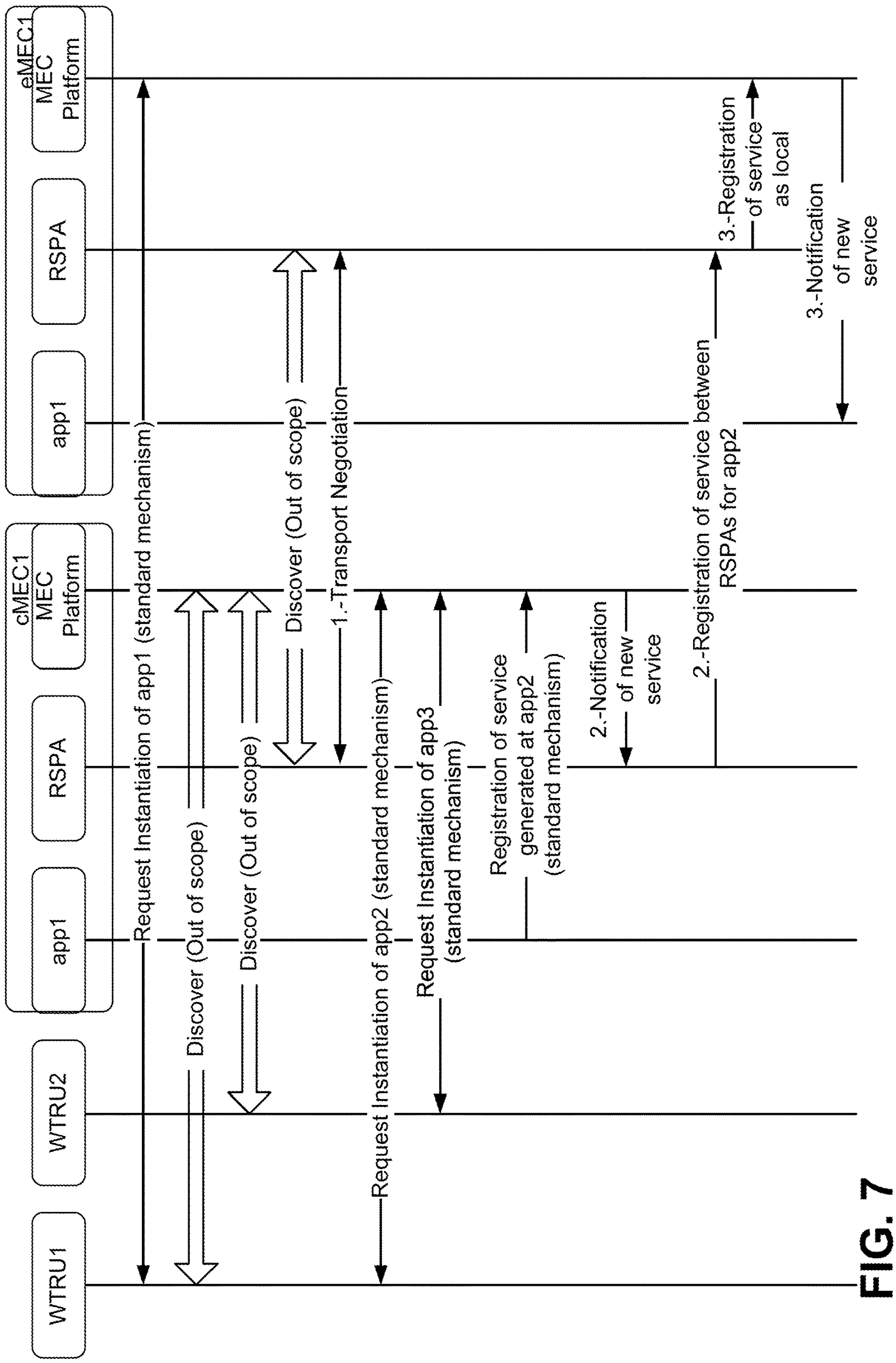
FIG. 7 illustrates an example message exchange.

FIG. 7 illustrates an example message exchange. Architecture and functionalities may be provided by RSPA. The remote service proxy application (RSPA) may be a functional entity. This function may take the form of an application running on a MEC platform or a function integrated within the MEC platform. This function may consider one or more of the following features: proxy of service data, proxy registrar of the service, negotiation of transport (e.g., with serialization), and/or transcoding of transport and serialization.

RSPA may consider a proxy of service data. The RSPA may be used to transport the service data generated by an application at a cMEC to a RSPA located in an eMEC. The RSPA may register the service and may provide the service data (e.g., actual service-data) locally, for example, acting as a proxy which may receive the service-data through a communication between RSPAs and may expose locally at the eMEC.

RSPA may consider a proxy registrar of the service. The RSPA may be used as a proxy for the registration of the services (e.g., without applications understanding the complexity of cMEC/eMEC communication), for example, so remote services may be registered in other eMEC/cMEC entities.

RSPA may consider negotiation of transport, for example, with serialization. If the RSPA serves as a proxy of service data, the RSPAs may negotiate transports and serializations, for example, to transport the service. This transport may be specific to a service (e.g., a cMEC to eMEC communication and/or per WTRU), for example, because (e.g., multiple) combinations of Telco eMEC, cMEC, transport, and serialization per service may be enabled (e.g., possible).

RSPA may consider transcoding of transport and serialization. If the proxy of service data functionality is used and a service is registered into the RSPA (e.g., using a transport which is not compatible with the transport used to proxy the service), then the RSPA may translate between the different transports and serializations, for example, depending on its capabilities.

Negotiation of the transport (e.g., transport parameters) may be used to forward a service between a cMEC/eMEC. A (e.g., different) mechanism may be used to transport the service information between applications, for example, instantiated at the cMEC and eMEC. Remote transport may be provided by the applications. In this case, the RSPAs may be used to register the services generated at cMECs into eMECs, for example, while the consumption of the service may be directly performed, for example, using the remote transport capabilities included in Mp1. Remote transport may be provided by RSPAs. If the application does not allow remote transport or if there is a technical impossibility (e.g., directly connecting two applications for the service consumption), the RSPA may transport the service information between the peer RSPAs, and the service at the remote eMECs may be consumed as local. The transport used by the RSPA may take the following forms: general transport and/or specific transport. General transport may be negotiated between the eMEC and cMEC RSPAs. In this case, the RSPAs may negotiate a common transport that may be used, for example, for the transport of a service registered for the Proxy service. Specific transport for a service may be used. The RSPA may negotiate a specific transport (e.g., transport parameters) between the peer RSPAs, for example, based on the specific characteristics of the service being exposed.

A secured communication setup between peer RSPAs may be provided. This communication may enable the communication through the Mpp-rspa interface (e.g., as described herein).

The first message defined for the Mpp-rspa interface may be the negotiation of the transport to be used, for example, to proxy the services between two RSPAs. In order to start the negotiation, the rspa@cmec1 may POST a message (e.g., a . . . /rspa_transport_negotiation message), for example, containing the TransportNegotiation data type. Table 1 illustrates TransportNegotiation data type(s).

TABLE 1

TransportNegotiation data type

| Attribute name | Data type | Cardinality | Description |
|---|---|---|---|
| cMECID | String | 1 | Identifier of the cMEC. This attribute may be globally unique. |
| serviceIdentifier | ServiceIdentifier | 0 . . . 1 | Structure identifying the service to which the transport may be applied. If this message is used to define the general transport to be used for all services between this cMEC and eMEC then this parameter may not appear. |

TABLE 1-continued

| TransportNegotiation data type | | | |
|---|---|---|---|
| Attribute name | Data type | Cardinality | Description |
| availableTransports | TransportOption | 0 . . . N | Contains a list of transports available between the peer RSPAs. It may be included in the PUT but it may not be included in the response from the peer MEC. In the case of a PUT message, at least 1 available Transport parameter may be contained in the message. |
| preferredTransports | TransportOption | 0 . . . N | Contains a list of preferred transports between the peer RSPAs. It may be included in the PUT but it may not be included in the response from the peer MEC. |
| selectedTransport | TransportOption | 0 . . . 1 | Includes the chosen transport by the peer RSPA. It may be only included in the answer from the peer RSPA. In case the message is a response, at least 1 selectedTransport field may be included. |

Figure 8:
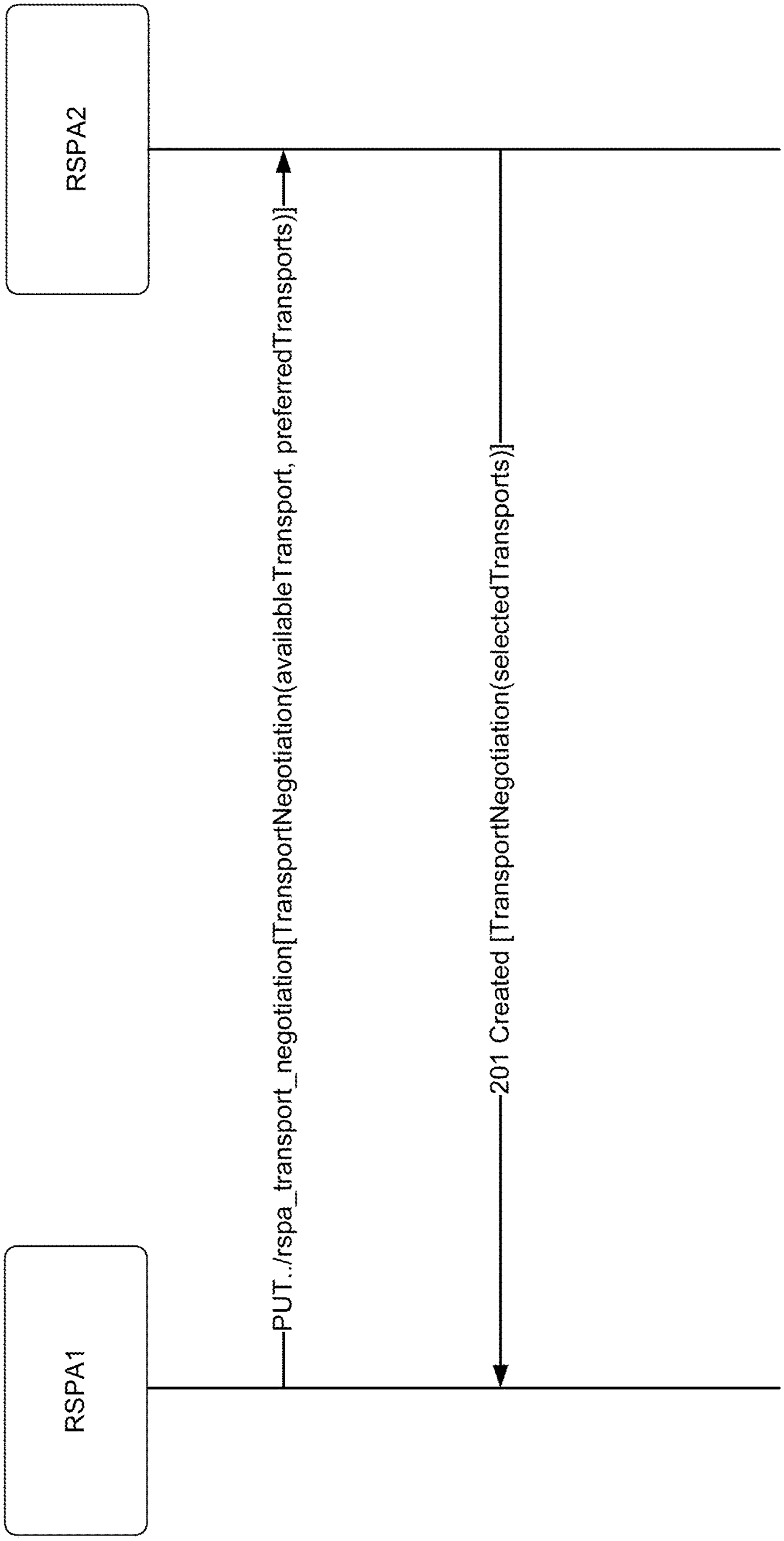
FIG. 8 illustrates an example behavior of a message, such as a rspa_transport_negotiation message.

FIG. 8 illustrates an example behavior of the rspa_transport_negotiation message. The negotiation may be done in a general (e.g., for all services exposed among a cMEC and eMEC) or on a per-service basis.

Registration process of the services may be produced at the cMEC/eMEC. The registration process may include the different messages exchanged to register the service across all the MEC platforms involved and their respective RSPAs.

The instantiated application in the cMEC (e.g., app2@cmec1) may register a service in the MEC platform of cMEC1, for example, following the standardized mechanisms defined in Mp1. The application may indicate the service may be exposed to the eMEC, for example, by indicating it in a modified version of the LocalityType included in the ServiceInfo Data type, as defined in Table 2. Table 2 illustrates a modified LocalityType data type.

TABLE 2

| Modified LocalityType Data Type | |
|---|---|
| Enumeration Value | Description |
| cMIEC | Service generated at a cMEC associated |

At the time of registering the service, the application (app2@cmec1) may flag the availability of the service to be consumed locally or remotely, for example, by using the consumedLocalOnly boolean field of the ServiceInfo data type. If at registration a scopeOfLocality equal to cMEC and a consumedLocalOnly equal to True is indicated, the service may be consumed through the RSPA (e.g., the service data may be transported between the peer RSPAs and consumed at the eMEC as local). If the scopeOfLocality is set to cMEC and consumedLocalOnly is set to False, then the service may be registered using the RSPA, for example, but the consumption may use directly the transport provided by the application (e.g., app2@cmec1).

The RSPA at the cMEC may subscribe itself to receive notifications (e.g., all SerAvailabilityNotificationSubscription notifications) dealing with services that may be exposed to an eMEC. In order to do so, the cMEC may use the subscription mechanisms defined on the Mp1 interface, for example, by using the Attributes of SerAvailabilityNotificationSubscription (e.g., as shown in Table 3, where the filtering criteria has been modified to account for services that can be exposed).

TABLE 3

| Modified Attributes of SerAvailabilityNotificationSubscription | | | |
|---|---|---|---|
| Attribute name | Data type | Cardinality | Description |
| filteringCriteria | Structure (inlined) | 0 . . . 1 | Filtering criteria to match services for which events are requested to be reported. If absent, may match all services. All child attributes are combined with the logical "AND" operation. |
| >exposedService | Boolean | 0 . . . 1 | Restrict event reporting to services with LocalityType set to cMEC |

The RSPA at the cMEC (e.g., rspa@cmec1) may receive the notification of the service registered at the cMEC platform. Following a request to gain the information on the service (e.g., using Mp1 interface, {apiRoot}/mec_service_mgmt/v1/service resource), the RSPA may obtain the information about the transport options for the service and the expectations of the application, for example, in terms of using the RSPA to proxy the consumption of the service or the use of remote transport options directly between the apps involved.

If the application indicates using RSPA to proxy the consumption of the service (e.g., scopeOfLocality is equal to cMEC and a consumedLocalOnly is equal to True), the RSPA may check if the transport (e.g., negotiated generic transport) between peer RSPAs is compatible with the transport used by the application. If it is compatible, the RSPA may use the generic transport, for example, to forward the service data to the RSPA (e.g., as described herein). If it is not compatible, depending on the capabilities of the RSPA, the RSPA may perform a translation of transports, for example, between the local cMEC application and the transport used to communicate RSPAs, or the RSPA may negotiate a service specific transport between the RSPAs for this specific service (e.g., as described herein).

To register the service at the eMEC, the RSPA at the cMEC1 (e.g., rspa@cmec1) may register this service with the RSPA at the eMEC (e.g., rspa@emec1). This may be performed using Mpp-rspa, for example, by issuing a POST with a message (e.g., ./rspa_service_registration), which may include a ExposedServiceInfo data type (e.g., as shown in Table 4).

TABLE 4

ExposedServiceInfo data type

| Attribute name | Data type | Cardinality | Description |
|---|---|---|---|
| serName | SerName | 1 | The name of the service. This is how the service producing MEC application identifies the service instance it produces. |
| serCategory | CategoryRef | 0 . . . 1 | A Category reference. (The category resource is used to group product offerings, service and resource candidates in logical containers. Categories may contain other categories and/or product offerings, resource or service candidates.) For the serCategory, the example values include: 1. RNI 2. Location 3. Bandwidth Management |
| version | String | 1 | The version of the service. |
| state | ServiceState | 1 | Contains the service state. |
| transportId | String | 0 . . . 1 | Identifier of the negotiated transport as indicated in the SelectedTransport field of the TransportNegotiation data type. This includes the serialization choice. In case the service may use an application provided remote transport, then transportId may not be present. |
| transportInfo | TransportInfo | 0 . . . 1 | Information regarding the application provided remote transport used by the service. May be present in POST requests to signal the use of an application-provided transport for the service. |
| serializer | SerializerType | 0 . . . 1 | Indicate the supported serialization format of the service. May be used in case transportInfo is used and may not be needed in case transportId is used since the negotiated transport may already include a serialization. |
| consumedLocalOnly | Boolean | 0 . . . 1 | Indicate whether the service may be (e.g., may only be) consumed by the MEC applications located in the same locality (as defined by scopeOfLocality) as this service instance (TRUE) or not (FALSE). Default to TRUE if absent. This field set to TRUE indicates the use of a negotiated transport and RSPA acting as proxy for the consumption of the service. This field set to FALSE indicates application specific remote transport may be used. |

The RSPA at the eMEC1 (e.g., rspa@emec1) may receive this primitive (e.g., message) and respond, for example, with a 200 OK or 201 Created, which may indicate the creation of the resource (e.g., correct registration of the service). This response message may include an ExposedServiceInfo data type, for example, with the information of the created service at the RSPA and a link or uniform resource locator (URL) to reference the service at the RSPA.

The service may be made available at the remote peer. If the RSPA at the eMEC1 has received the registration from rspa@cmec1, it may proceed to register the service into the MEC platform of eMEC1, for example, through Mp1 procedures. With standard procedures, the RSPA may indicate the cMEC as the scopeOfLocality.

If the RSPA may be used as a proxy for the consumption of the service, the RSPA may indicate the service may be directly generated by the RSPA and it is generated locally, for example, using a MEC platform provided transport to consume it. If the RSPA may not be used as proxy, it may register (e.g., make available) the service and expose the service as a service available remotely, for example, indicating the application specific transport provided by the app1@cmec1 to consume the service.

The state of services may be updated. A service may be de-registered. Services availability may change, for example, due to different circumstances, for example, such as de-instantiation of the application providing it.

A coordinated state among the different RSPAs may be maintained. A coordinated state among the different RSPAs may be maintained, for example, by updating the information on a service (e.g., based on its modification or change). Updating the information on a service may be performed using the interface Mpp-rspa, for example, by issuing a POST with a message (e.g., ./rspa_service_registration_update) which may include the ServiceAvailabilityNotification data type (e.g., as defined in Mp1). This action may take place, for example, if a service state goes from active to inactive. A coordinated state among the different RSPAs may be maintained, for example, by de-registering the service. This action may occur, for example if the service is inactive for a time. This may be performed using the defined interface Mpp-rspa, for example, by issuing a POST with a message (e.g., ./rspa_service_deregistration) which may include the ServiceAvailabilityNotification data type (e.g., as defined in Mp1) and indicate a changeType of REMOVED.

Referenced data types may be provided.

TABLE 5

ServiceIdentifier Data Type

| Attribute name | Data type | Cardinality | Description |
|---|---|---|---|
| serId | String | 1 | Identifier of the service within the MEC platform |
| serName | SerName | 1 | The name of the service. This may be how the service producing MEC application identifies the service instance it produces. |
| serCategory | CategoryRef | 1 | A Category reference.<br>(The category resource may be used to group product offerings, service and resource candidates in logical containers. Categories may contain other categories and/or product offerings, resource or service candidates.) For the serCategory, the example values include:<br>1. RNI<br>2. Location<br>3. Bandwidth Management |

TABLE 6

TransportOption Data Type

| Attribute name | Data type | Cardinality | Description |
|---|---|---|---|
| transportID | Sring | 1 | ID of the transport |
| transportInfo | TransportInfo | 1 | Information regarding the transport that may be used by the service. |
| serializer | SerializerType | 1 | Indicate the supported serialization format of the service. |

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed is:

1. A first wireless transmit/receive unit (WTRU), the first WTRU comprising:
- a processor that is configured to:
  - determine that an application provides a service and that the service can be used remotely;
  - send a first message to a second WTRU based on the determination, wherein the first message indicates an identification of the service and indicates a set of transport parameters;
  - receive a second message from the second WTRU, wherein the second message indicates that the second WTRU has created a resource associated with the service, wherein the second message indicates that the service has been registered with the second WTRU, and wherein the service is exposed to the second WTRU via a proxy; and
  - send a third message to the second WTRU using at least one transport parameter from the set of transport parameters, wherein the third message comprises data associated with the service that has been registered.

2. The first WTRU of claim 1, wherein the second WTRU is at least one of a multi-access edge computing (MEC) device, a constrained MEC device, or an MEC device associated with a Telco Edge node.

3. The first WTRU of claim 1, wherein the first WTRU is at least one of a multi-access edge computing (MEC) device, a constrained MEC, or a server.

4. The first WTRU of claim 1, wherein the processor is further configured to:
- send a negotiation request message to the second WTRU indicating a transport data type; and
- receive a negotiation response message from the second WTRU indicating the at least one transport parameter from the set of transport parameters.

5. The first WTRU of claim 1, wherein the processor is further configured to:
- send a service update message to the second WTRU, wherein the service update message indicates that there has been a modification of data associated with the service.

6. The first WTRU of claim 1, wherein the processor is further configured to:
- send a deregistration request message to the second WTRU, wherein the deregistration request message indicates a request for the second WTRU to deregister the service; and
- receive a deregistration response message, wherein the deregistration response message indicates that the service has been deregistered.

7. The first WTRU of claim 1, wherein the first message is sent via an interface, the second message is received via the interface, and the third message is sent via the interface.

8. A first wireless transmit/receive unit (WTRU), the first WTRU comprising:
- a processor configured to:
  - receive a first message, wherein the first message indicates an identification of a service and indicates a set of transport parameters;
  - send a second message to a second WTRU when the service has been registered and when a resource associated with the service has been created, wherein the service is exposed to the first WTRU via a proxy; and
  - receive a third message using at least one transport parameter from the set of transport parameters, wherein the third message comprises data associated with the service that has been registered.

9. The first WTRU of claim 8, wherein the first WTRU is at least one of a multi-access edge computing (MEC) device, a constrained MEC, or an MEC device associated with a Telco Edge node.

10. The first WTRU of claim 8, wherein the second WTRU is at least one of a wireless transmit/receive unit (WTRU), a multi-access edge computing (MEC) device, a constrained MEC, or a server.

11. The first WTRU of claim 8, wherein the processor is further configured to:
- receive a negotiation request message from the second WTRU, wherein the negotiation request message indicates a transport data type; and
- send a negotiation response message to the second WTRU, wherein the negotiation response message indicates the at least one transport parameter from the set of transport parameters, and wherein the at least one transport parameter is selected from the set of the transport parameters based on the indicated transport data type.

12. The first WTRU of claim 8, wherein the processor is further configured to:
- receive a service update message that indicates that there has been a modification of data associated with the service.

13. The first WTRU of claim 8, wherein the processor is further configured to:
- receive a deregistration request message, wherein the deregistration request message indicates a request for the first WTRU to deregister the service;
- deregister the service; and
- send a deregistration response message to the second WTRU when a resource associated with the service has been released, wherein the deregistration response message indicates that the service has been deregistered.

14. The first WTRU of claim 8, wherein the first message is sent via an interface, the second message is received via the interface, and the third message is sent via the interface.

15. A method, the method comprising:
- determining that an application provides a service and that the service can be used remotely;
- sending a first message to a wireless transmit/receive unit (WTRU) based on the determination, wherein the first message indicates an identification of the service and indicates a set of transport parameters;
- receiving a second message from the WTRU, wherein the second message indicates that the WTRU has created a resource associated with the service, wherein the second message indicates that the service has been registered with the WTRU, and wherein the service is exposed to the WTRU via a proxy; and sending a third message to the WTRU using at least one transport parameter from the set of transport parameters, wherein the third message comprises data associated with the service that has been registered.

16. The method of claim 15, wherein the WTRU is at least one of a multi-access edge computing (MEC) device, a constrained MEC device, an MEC device associated with a Telco Edge node, or a server.

17. The method of claim 15, further comprising:

sending a negotiation request message to the WTRU indicating a transport data type; and receiving a negotiation response message from the WTRU indicating the at least one transport parameter from the set of transport parameters.

18. The method of claim 15, further comprising:

sending a service update message to the WTRU, wherein the service update message indicates that there has been a modification of data associated with the service.

19. The method of claim 15, further comprising:

sending a deregistration request message to the WTRU, wherein the deregistration request message indicates a request for the WTRU to deregister the service; and receiving a deregistration response message, wherein the deregistration response message indicates that the service has been deregistered.

20. The method of claim 15, wherein the first message is sent via an interface, the second message is received via the interface, and the third message is sent via the interface.

* * * * *